United States Patent [19]
Miki et al.

[11] Patent Number: 6,009,708
[45] Date of Patent: Jan. 4, 2000

[54] CONTROL APPARATUS FOR CONSTRUCTION MACHINE

[75] Inventors: Masatoshi Miki; Kazunori Yoshino; Makoto Samejima; Tomohiro Akaki, all of Tokyo; Shigeyoshi Mitsumori, Takasago, all of Japan

[73] Assignee: Shin Caterpillar Mitsubishi Ltd., Tokyo, Japan

[21] Appl. No.: 09/077,833

[22] PCT Filed: Mar. 14, 1997

[86] PCT No.: PCT/JP97/00820

§ 371 Date: Jun. 4, 1998

§ 102(e) Date: Jun. 4, 1998

[87] PCT Pub. No.: WO98/24987

PCT Pub. Date: Nov. 6, 1998

[30] Foreign Application Priority Data

Dec. 3, 1996 [JP] Japan ................................. 8-323162

[51] Int. Cl.[7] ........................................................ F02B 27/02
[52] U.S. Cl. ................................. 60/414; 60/489; 91/457

[56] References Cited

U.S. PATENT DOCUMENTS

| | | | |
|---|---|---|---|
| 4,204,405 | 5/1980 | Basham | 60/414 X |
| 4,215,545 | 8/1980 | Morelle et al. | 60/413 |
| 4,227,587 | 10/1980 | Carman | 60/414 X |
| 4,416,187 | 11/1983 | Nystrom Per | 91/454 X |
| 4,534,169 | 8/1985 | Hunt | 60/414 |
| 4,592,454 | 6/1986 | Michel | 60/414 X |
| 4,724,673 | 2/1988 | Curnow | 60/489 |
| 4,731,997 | 3/1988 | Hagin | 60/416 |
| 4,754,603 | 7/1988 | Rosman | 60/413 X |
| 4,813,234 | 3/1989 | Nikolaus | 60/414 X |
| 4,813,510 | 3/1989 | Lexen | 60/414 X |
| 4,974,994 | 12/1990 | Kirstein et al. | 60/414 X |
| 5,211,196 | 5/1993 | Schwelm | 91/454 X |
| 5,579,868 | 12/1996 | Pelto-huikko | 60/414 X |

FOREIGN PATENT DOCUMENTS

| | | | |
|---|---|---|---|
| 3248289 | 7/1983 | Germany | 60/414 |
| 3-244720 | 10/1991 | Japan . | |
| 5-64253 | 8/1993 | Japan . | |
| 6-280287 | 4/1994 | Japan . | |
| 7-42385 | 4/1995 | Japan . | |

*Primary Examiner*—John E. Ryznic
*Attorney, Agent, or Firm*—Morrison & Foerster LLP

[57] ABSTRACT

The present invention relates to a control apparatus for a construction machine such as a hydraulic shovel, and the control apparatus for a construction machine includes a revolving operation member for operating a construction machine revolving unit (14), a fluid pressure pump (2) and an accumulator (5) for accumulating working oil from the fluid pressure pump (2), a fluid pressure actuator (7) for driving the construction machine revolving unit (14) to revolve with the working oil from the fluid pressure pump (2) and the accumulator (5), a first control valve (8) interposed between the fluid pressure actuator (7) and the fluid pressure pump (2), a second control valve (11) for controlling an inflow condition of the fluid from the fluid pressure actuator (7) into the accumulator (5), and control means (9) including first valve control means (9a) for controlling the first control valve (8) and second valve control means (9b) for controlling the second control valve (11).

6 Claims, 4 Drawing Sheets

CONTROL APPARATUS FOR CONSTRUCTION MACHINE

TECHNICAL FIELD

This invention relates to a control apparatus for a construction machine such as a hydraulic shovel, and more particularly to a control apparatus for a construction machine constructed so as to achieve effective utilization of energy.

BACKGROUND ART

Generally, a construction machine (working machine) such as a hydraulic shovel and so on is composed of, as shown in FIG. 3, an upper revolving unit 102, a lower traveling unit 100 and a working apparatus 118.

The lower traveling unit 100 includes a right track 100R and a left track 100L which can be driven independently of each other. Meanwhile, the upper revolving unit 102 is provided for revolving movement in a horizontal plane with respect to the lower traveling unit 100.

The working apparatus 118 is principally composed of a boom 103, a stick 104, a bucket 108 and so forth, and the boom 103 is mounted for pivotal motion with respect to the upper revolving unit 102. Further, the stick 104 is connected for pivotal motion similarly in a vertical plane to an end of the boom 103.

A boom driving hydraulic cylinder (boom cylinder) 105 for driving the boom 103 is provided between the upper revolving unit 102 and the boom 103, and a stick driving hydraulic cylinder (stick cylinder) 106 for driving the stick 104 is provided between the boom 103 and the stick 104. Further, a bucket driving hydraulic cylinder (bucket cylinder) 107 for driving the bucket 108 is provided between the stick 104 and the bucket 108.

By such a construction as described above, the boom 103 is constructed for pivotal motion in an a direction and a b direction in the figure and the stick 104 is constructed for pivotal motion in a c direction and a d direction in the figure, and the bucket cylinder 107 is constructed for pivotal motion in an e direction and an f direction in the figure.

FIG. 4 is a view schematically showing a construction of essential part of a hydraulic circuit of such a hydraulic shovel as described above. As shown in FIG. 4, traveling motors 109L and 109R as power sources which are independent of each other are provided for the left track 100L and the right track 100R described above, respectively, and a revolving motor 110 for driving the upper revolving unit 102 to revolve with respect to the lower traveling unit 100 is provided for the upper revolving unit 102.

The traveling motors 109L and 109R and revolving motor 110 mentioned above are constructed as hydraulic motors which are operated by a hydraulic pressure, and working oil of a predetermined hydraulic pressure is supplied to them through a hydraulic pump driven by an engine (principally by a Diesel engine) not shown or a hydraulic control circuit apparatus 111 shown in FIG. 4.

In response to a working oil pressure supplied in this manner, the hydraulic motors 109L, 109R and 110 are driven. Also the cylinders 105 to 107 are driven by the hydraulic pressure from the hydraulic pump driven by the engine not shown in a similar manner as described above.

An operator cab 101 includes, as operation members for controlling operation of the hydraulic shovel (traveling, revolving, pivotal motion of the boom, pivotal motion of the stick and pivotal motion of the bucket), a left lever 101B, a right lever 101C, a left pedal 101L, a right pedal 101R and so forth.

When, for example, an operator operates the lever 101B or 101C and/or the pedal 101L or 101R, the hydraulic control circuit apparatus 111 is controlled so that a suitable one or ones of the cylinders 105 to 107 and the hydraulic motor 109L, 109R and 110 are driven. As a result of the driving, the upper revolving unit 102 can be revolved, or the boom 103, stick 104, bucket 108 and so forth can be pivoted, or the hydraulic shovel can be driven to travel.

By the way, as shown in FIG. 4, the hydraulic control circuit apparatus 111 includes hydraulic control valves (main control valves) 111-1 to 111-6 for adjusting control amounts of the cylinders 105 to 107 and the hydraulic motors 109L, 109R and 110, respectively.

Here, all of the main control valves 111-1 to 111-6 are 3-mode directional control valves having three modes of neutral, extension (forward operation) and contraction (reverse operation), and operation conditions thereof are changed over by pilot hydraulic pressures supplied thereto via pilot fluid paths 112-1 to 112-6, respectively.

The fluid paths 112-1 to 112-6 are mechanically connected to the operation members (levers and pedals) 101B, 101C, 101L and 101R via remotely controlled valves 14-1 to 14-6.

In order, for example, to move the boom 103 upwardly (in the a direction in FIG. 3) from its stopping condition, an operator will operate the right lever 101C to change over the remotely controlled valve 14-1 to change over the feeding condition of the pilot hydraulic pressure in the pilot fluid path 112-1. Consequently, the pilot hydraulic pressure acts in a desired condition upon the control valve 111-1 so that the control valve 111-1 is changed over from the neutral mode to the extension mode.

After the control valve 111-1 is changed over into the extension mode in this manner, the working oil pressure from the hydraulic pump is supplied to a pressure chamber of the boom cylinder 105 on the lower side in the figure through fluid paths 113-1 while the working oil in another pressure chamber of the boom cylinder 105 on the upper side in the figure is drained so that the boom cylinder 105 is extended.

Similarly, the control valve 111-2 is changed over by the pilot hydraulic pressure supplied thereto by an operation of the right lever 101C. This pilot hydraulic pressure is supplied through the pilot fluid paths 112-2, and when the control valve 111-2 is changed over by an action of this pilot hydraulic pressure, the feeding condition of the working oil from fluid paths 113-2 to the bucket cylinder 107 is controlled. Consequently, the bucket cylinder 107 is driven to be contracted to drive the bucket 108.

Further, the control valve 111-3 is changed over by the pilot hydraulic pressure supplied thereto by an operation of the left pedal 101L. This pilot hydraulic pressure is supplied through the pilot fluid path 112-3, and when the control valve 111-3 is changed over by an action of this pilot hydraulic pressure, the feeding condition of the working oil from fluid paths 113-3 to the left side traveling motor 109L is controlled. Consequently, the driving condition of the left side traveling motor 109L is controlled (that is, the speed of rotation is controlled) to control the driving condition of the left track 100L.

On the other hand, the hydraulic control valve 111-4 is changed over by an operation of the right pedal 101R, and the driving condition of the right side traveling motor 109R is controlled by an action similar to that of the control valve 111-3 described above.

Furthermore, the control valve 111-5 is changed over by the pilot hydraulic pressure supplied thereto by an operation of the left lever 101B. This pilot hydraulic pressure is supplied through the pilot fluid path 112-5, and when the control valve 111-5 is changed over by an action of the pilot hydraulic pressure, the feeding condition of the working oil from a fluid path 113-5 to the revolving motor 110 is controlled. Consequently, the driving condition of the revolving motor 110 is controlled to drive the upper revolving unit 102 to revolve.

On the other hand, the control valve 111-6 is changed over by the pilot hydraulic pressure supplied thereto by an operation of the left lever 101B and acts in a similar manner to the control valves 111-1 and 111-2 described above. Then, by changing over the control valve 111-6, the hydraulic pressure to act upon the stick cylinder 106 can be controlled to control the driving condition of the stick 104.

By the way, from among such operation controls of the different components as described above, for example, in order to revolve the upper revolving unit 102, an operator will first operate the lever 101B to start operation of the revolving motor 110.

Then, after the upper revolving unit 102 starts its revolving movement by a rotational driving force of the revolving motor 110, the operator will return the lever 101B to its neutral position before the upper revolving unit 102 is revolved to an aimed position. This is performed because an inertial force arising from the revolving movement acts upon the upper revolving unit 102 and because, if the lever 101B is returned to its neutral position after the upper revolving unit 102 is revolved to the aimed stopping position, then the actual stopping position passes the aimed stopping position.

Further, when the upper revolving unit 102 is revolved by an inertial force even if the operator returns the lever 101B to its neutral position in this manner, a crossover relief valve 120 disposed between the fluid path 113-5 of the revolving motor 110 operates to absorb the kinetic energy of the upper revolving unit 102.

This crossover relief valve 120 provides, when the revolving motor 110 is driven by the upper revolving unit 102 and the revolving motor 110 acts as a pump, resistance to the working oil discharged from the revolving motor 110 to absorb the kinetic energy of the upper revolving unit 102. Consequently, the crossover relief valve 120 has a function also as a resistor.

Further, the crossover relief valve 120 is a valve which is opened when the hydraulic pressure in the fluid paths 113-5 becomes higher than a predetermined pressure, and when the control valve 111-5 is in its neutral position and the revolving motor 110 is driven by the upper revolving unit 102, the working oil is circulated between the fluid path 113-5 and the revolving motor 110 via the crossover relief valve 120. In this instance, resistance acts upon the working oil by an action of the crossover relief valve 120 to absorb the kinetic energy of the upper revolving unit 102.

However, when such a crossover relief valve as described above is operated to stop revolution of the upper revolving unit, the kinetic energy of the upper revolving unit is discharged principally as thermal energy into the atmospheric air, and this is not always preferable from a point of view of effective utilization of energy.

Particularly, since an upper revolving unit of a construction machine has a counterweight placed at a position thereof spaced as far as possible from the center of revolving motion of the upper revolving unit in order to prevent the body from being tilted by a load upon working, the angular moment is high and the kinetic energy is high.

Therefore, it is demanded to effectively regenerate, when such an upper revolving unit as described above is to be stopped, the kinetic energy of the upper revolving unit to achieve effective utilization of the resources.

The present invention has been made to meet such a demanded as described above, and it is an object of the present invention to provide a control apparatus for a construction machine which can regenerate energy originating from an inertial force of a fluid pressure operated member of the construction machine to allow effective utilization of energy.

DISCLOSURE OF INVENTION

To this end, a control apparatus for a construction machine of the present invention is characterized in that it comprises operation means at least having a revolving operation member for operating a construction machine revolving unit of the construction machine, working fluid supply means at least including a fluid pressure pump driven by a prime mover and an accumulator for accumulating working fluid on the discharge side of the fluid pressure pump, driving means including a fluid pressure actuator for driving the construction machine revolving unit to revolve with the working fluid from the working fluid supply means, valve means including a first control valve interposed between the driving means and the working fluid supply means for controlling a revolution condition of the construction machine revolving unit by the fluid pressure actuator, and a second control valve interposed between the fluid pressure actuator and the accumulator for controlling an inflow condition of the fluid from the fluid pressure actuator into the accumulator when the fluid pressure actuator is driven by the construction machine revolving unit, and control means including first valve control means for controlling the first control valve in response to an operation instruction received from the revolving operation member and second valve control means for controlling the second control valve when the fluid pressure actuator is driven by the construction machine revolving unit.

Accordingly, when a driving force is inputted to the fluid pressure actuator by the construction machine revolving unit, the working oil pressurized by the fluid pressure actuator is accumulated in the accumulator so that, when a next operation of the fluid pressure actuator is to be started, the fluid pressure actuator can be operated making use of the high pressure working oil in the accumulator, and there is an advantage that the load to the fluid pressure pump can be reduced. Also there is another advantage that, by such energy regeneration, the amount of fuel consumption for operation of the fluid pressure pump can be reduced.

Further, the control apparatus for a construction machine may be constructed such that a bypass path for bypassing the first control valve is interposed between the fluid pressure actuator and the accumulator, and the second control valve is interposed in the bypass path. In this instance, there is an advantage that, upon energy regeneration, the energy regeneration is effected without having any influence upon the first control valve.

Furthermore, the control apparatus for a construction machine may be constructed, in addition to the construction described above, such that a check valve mechanism for introducing the fluid from any of a pair of inflow/outflow ports of the fluid pressure actuator to the bypass path is provided between the inflow/outflow ports. By such a simple construction as just described, counter-flow of the working oil from the accumulator can be prevented simply and with certainty.

The control apparatus for a construction machine may be constructed further such that a crossover relief valve mechanism for absorbing rotational energy generated by revolution of the construction machine revolving unit is provided in parallel to the check valve mechanism. By this construction, there is an advantage that, when the pressure in the accumulator rises higher than a necessary level, revolution of the construction machine revolving unit can be stopped by rendering the crossover relief valve mechanism operative.

In this instance, preferably a sequence valve having a relief pressure set lower than a relief pressure set for the crossover relief valve mechanism is interposed at a portion of the bypass path adjacent the accumulator side with respect to a location of the second control valve. By this construction, there is an advantage that, upon regeneration of energy, the high pressure working oil generated in the fluid pressure actuator is preferentially introduced into the accumulator and energy regeneration can be effected efficiently.

Or, the control apparatus for a construction machine may be constructed such that an opening and closing valve is provided at a fluid inflow/outflow port of the accumulator. By this construction, there is an advantage that, when the pressure in the accumulator becomes excessively high, the accumulator can be protected with certainty by closing this opening and closing valve. Further, there is another advantage that, by controlling this opening and closing valve, only when the high pressure working oil accumulated in the accumulator is required, a required amount of it can be supplied to the fluid pressure actuator.

BEST MODE FOR CARRYING OUT THE INVENTION

Figure 1:
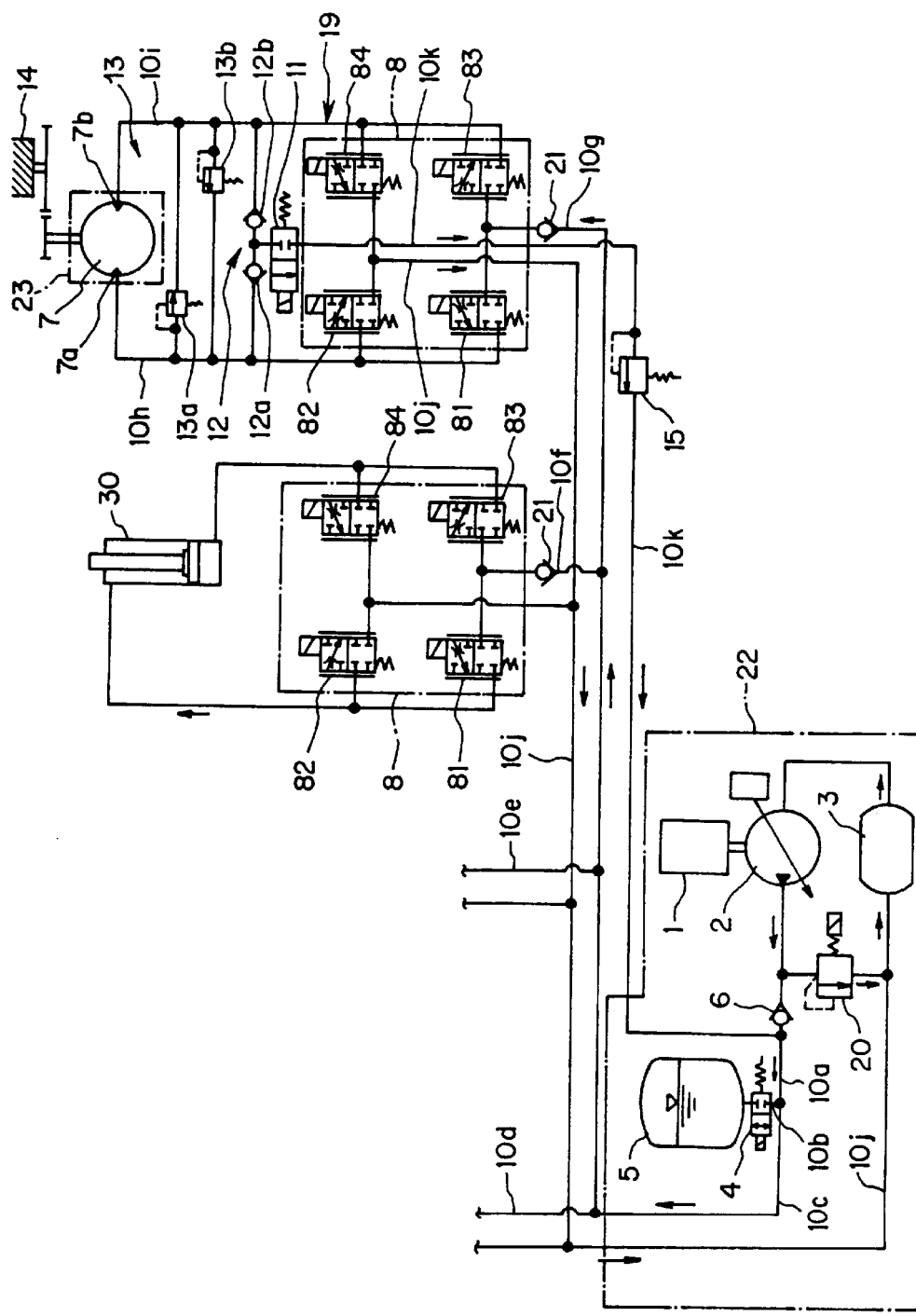
FIG. 1 is a schematic hydraulic circuit diagram showing an entire construction of a control apparatus for a construction machine as an embodiment of the present invention.
Figure 2:
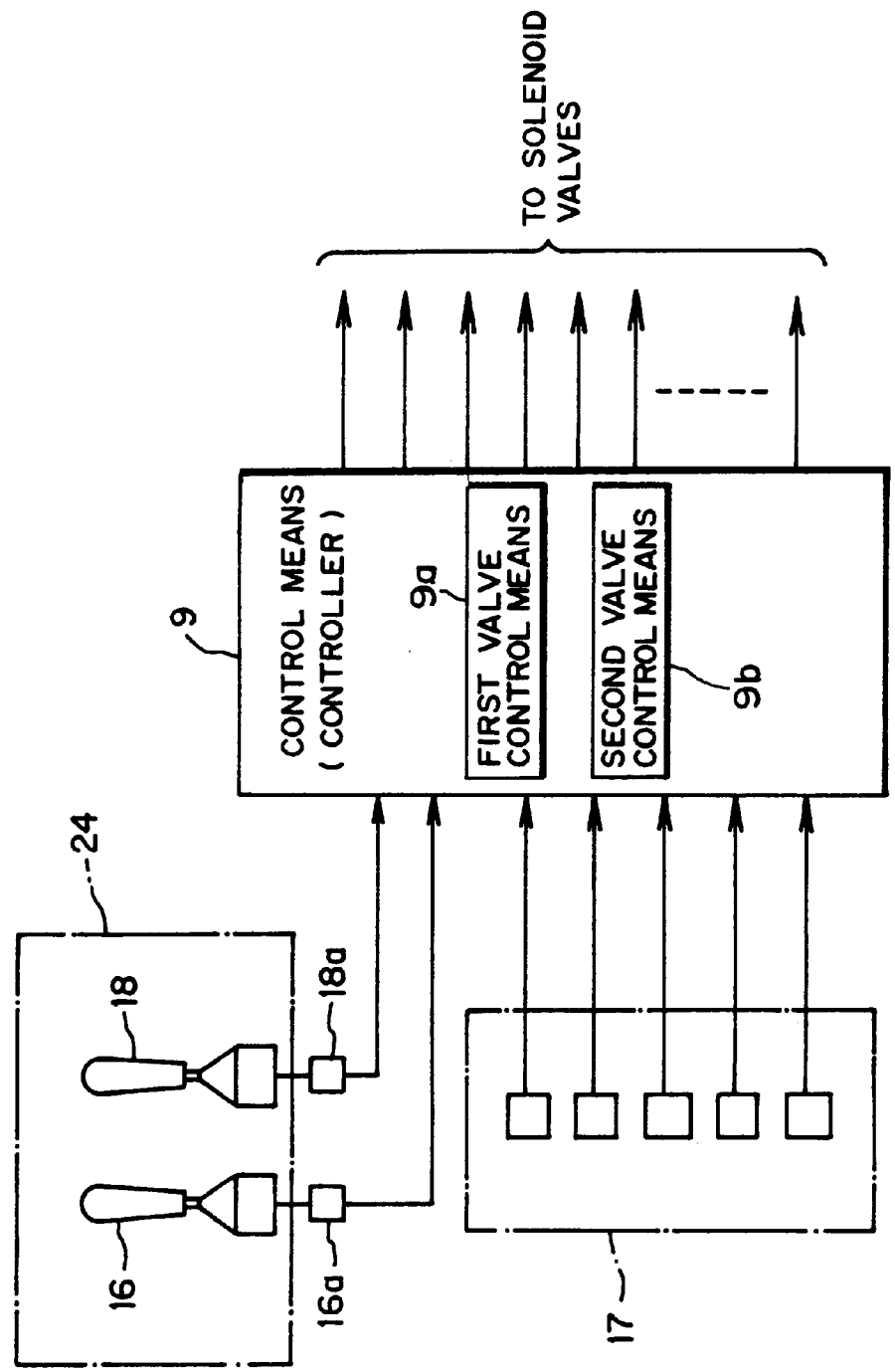
FIG. 2 is a schematic block diagram showing a construction of a control system of the control apparatus for a construction machine as the embodiment of the present invention.
Figure 3:
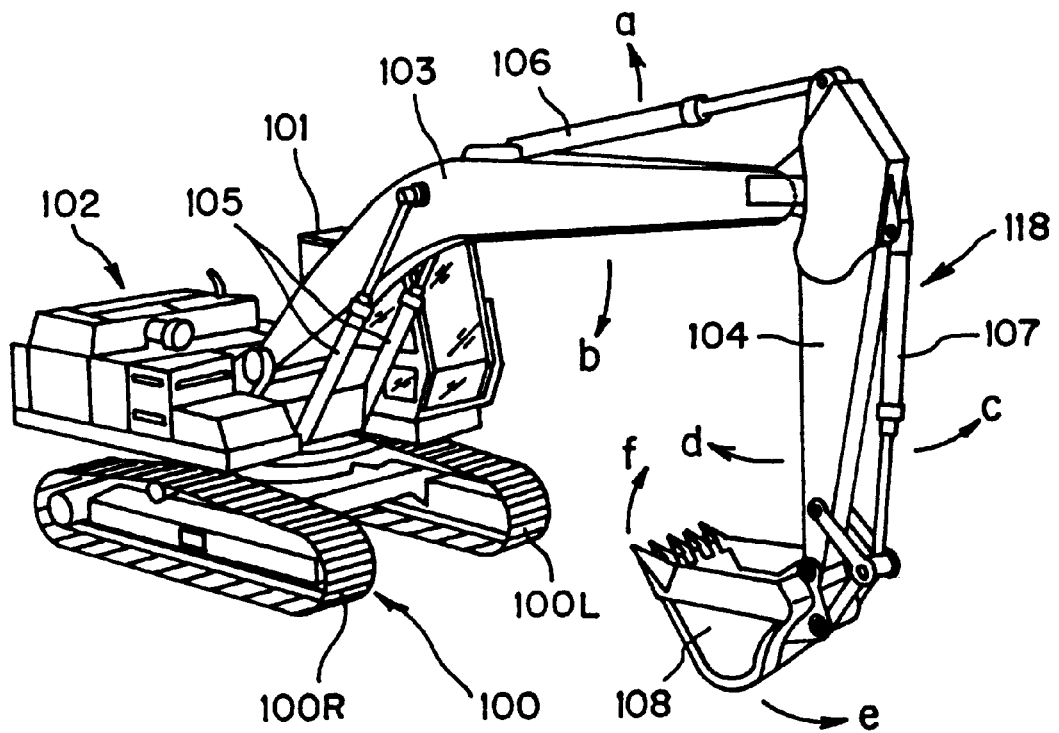
FIG. 3 is a schematic perspective view showing an appearance of a hydraulic shovel as an example of an ordinary construction machine.
Figure 4:
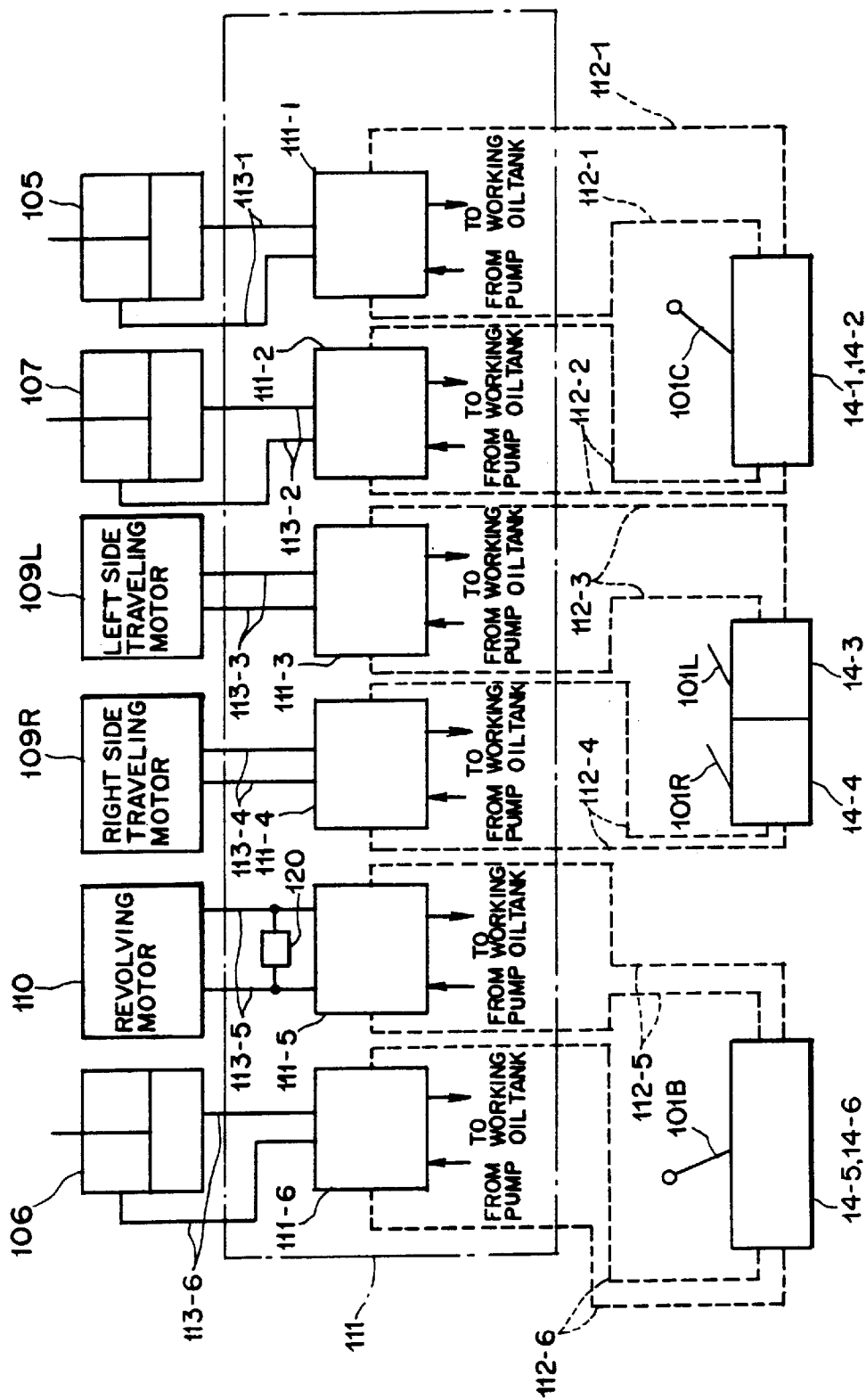
FIG. 4 is a schematic hydraulic circuit diagram illustrating a control apparatus for the ordinary construction machine.

In the following, a control apparatus for a construction machine as an embodiment of the present invention is described with reference to the drawings. FIG. 1 is a schematic hydraulic circuit diagram showing an entire construction of the control apparatus, and FIG. 2 is a schematic block diagram showing a construction of a control system of the control apparatus.

As shown in FIG. 1, a hydraulic pump (fluid pressure pump) 2 which is driven by an engine (prime mover) 1 is provided in the inside of a construction machine, and working oil in a working oil tank 3 is pressurized to a predetermined pressure by this hydraulic pump 2. In the present construction machine, a boom, a stick, a bucket (none of which is shown) and so forth are operated using the working oil pressurized in this manner.

Further, in FIG. 1, reference numeral 22 denotes working fluid supply means, and this working fluid supply means 22 is constructed including, in addition to the engine 1 and the hydraulic pump 2 described above, an accumulator 5 which is hereinafter described. The stick, the bucket or a revolving motor 7 is operated by working oil supplied from this working fluid supply means 22.

The hydraulic pump 2 here is constructed as a known piston-type variable delivery pump and is constructed so as to allow flow rate control by changing the stroke amount of a piston (not shown) provided in the pump 2. In particular, the piston is constructed such that an end thereof contacts with a cam plate (creep plate) not shown and is constructed so as to change the stroke of the piston to change the delivery flow amount of the pump 2 by changing the inclination (tilting angle) of the cam plate.

Further, the hydraulic pump 2 includes a relief valve 20 which can be communicated with a drain path 10j to the working oil tank 3 such that, when the delivery pressure of the hydraulic pump 2 becomes higher than a predetermined pressure, this relief valve 20 is opened to allow the pressurized working oil to be returned into the tank 3.

Meanwhile, reference numeral 6 denotes a check valve, which is provided to prevent counter-flow of the working oil to the pump 2 side. On the downstream side of the check valve 6, a fluid path 10a is branched into two directions, and to a fluid path 10b which is one of the branched fluid paths, the accumulator 5 is connected via an opening and closing valve 4 formed from a solenoid valve. Here, the accumulator 5 is provided to temporarily store working oil supplied thereto from the hydraulic pump 2 and accumulate, upon energy regeneration, working oil pressurized by the revolving motor 7. It is to be noted that this energy regeneration is hereinafter described.

Meanwhile, as shown in the figure, the other fluid path 10c is further branched, on the downstream side, into a plurality of fluid paths 10d to 10g, which are individually connected to a plurality of fluid pressure actuators provided in the construction machine. Here, the fluid pressure actuators particularly are hydraulic cylinders for driving the boom, stick, bucket (none of which is shown) and so forth and hydraulic motors for performing traveling and revolving operations, and in the present embodiment, of those hydraulic cylinders and hydraulic motors, only a bucket cylinder 30 and the revolving motor (swing motor) 7 are shown. From such a revolving motor 7 as just mentioned, driving means 23 is formed.

As shown in FIG. 1, two inflow/outflow ports (first port and second port) 7a and 7b are provided on the revolving motor 7, and if working oil is supplied to one of the ports, then the motor 7 is rotated by the pressure of working oil and the working oil is discharged from the other port.

A first control valve 8 for changing over the working oil supply condition to the revolving motor 7 is provided between the revolving motor 7 and the hydraulic pump 2 such that conditions of forward rotation, reverse rotation and stopping (neutral) of the revolving motor 7 may be controlled by operating a revolving operation member such as an operation lever 16 shown in FIG. 2 to control changing over of the first control valve 8. It is to be noted that operation means 24 is formed from such an operation lever 16 as described above and another operation lever 18.

Further, valve means 19 is formed from the first control valve 8 and a second control valve 11 which is hereinafter described. This first control valve 8 is described briefly. This first control valve 8 corresponds to a main control valve of an ordinary construction machine, and here, it is constructed as a separate control type valve mechanism wherein working oil supply and working oil discharge to and from the ports 7a and 7b of the revolving motor 7 are controlled independently of each other.

Such a separate control type valve mechanism as just described is provided perceiving the operation response of an actuator (revolving motor 7, bucket cylinder 30 or the like), and as shown in FIG. 1, the first control valve 8 is formed from four two-way solenoid valves 81 to 84. By individually controlling the solenoid valves 81 to 84 provided independently of each other in this manner, supply and discharge of working oil can be performed rapidly and with a high degree of accuracy.

Operations of the solenoid valves 81 to 84 described above are all controlled by a controller (control means) 9 which is hereinafter described, and each of the solenoid valves 81 to 84 is constructed as a solenoid valve of the normally closed type which stops distribution of working oil when no operation instruction signal is inputted thereto from the controller 9.

Of the solenoid valves 81 to 84, the solenoid valve 81 for supplying working oil and the solenoid valve 82 for discharging working oil are provided for a fluid path 10h on the first port 7a side of the revolving motor 7 while the solenoid valve 83 for supplying working oil and the solenoid valve 84 for discharging working oil are disposed for a fluid path 10i on the second port 7b side.

Further, of the solenoid valves 81 to 84 described above, the solenoid valves 81 and 83 are connected to a working oil supplying fluid path 10g from the hydraulic pump 2 while the solenoid valves 82 and 84 are connected to the oil path (return path) 10j for draining working oil to the tank 3.

In the present embodiment, the revolving motor 7 is rotated forwardly by simultaneously changing over the solenoid valve 81 and the solenoid valve 84 to an on-state to supply working oil to the first port 7a and returning working oil discharged from the second port 7b to the tank 3 through the return path 10j. On the contrary, the revolving motor 7 is rotated reversely by simultaneously changing over the solenoid valve 83 and the solenoid valve 82 to an on-state to supply working oil to the second port 7b and returning working oil discharged from the first port 7a to the tank 3 through the return path 10j.

By the way, a fluid path (bypass path) 10k for bypassing the first control valve 8 (that is, the solenoid valves 81 to 84) is provided between the revolving motor 7 and the accumulator 5, and the solenoid valve (second control valve) 11 constructed for communication and interruption of the bypass path 10k is interposed in the bypass path 10k.

Also this solenoid valve 11 is controlled between on- and off-states by the controller 9 described above and is a normally closed solenoid valve which normally interrupts the bypass path 10k.

Further, this bypass path 10k is connected, on the upstream side of the solenoid valve 11, to the first port 7a and the second port 7b through a check valve mechanism 12 such that, when the solenoid valve 11 is controlled to a communication condition, working oil from the first port 7a or the second port 7b is fed to the accumulator 5 via the bypass path 10k.

It is to be noted that, as shown in the figure, this check valve mechanism 12 is composed of a first check valve 12a connected to the first port 7a side and a second check valve 12b connected to the second port 7b side.

This construction is employed so as to cope with both of a case wherein the revolving motor 7 is driven in the forward rotation direction and another case wherein the revolving motor 7 is driven in the reverse rotation direction, and in any case, working oil discharged from the first port 7a or the second port 7b is fed to the accumulator 5 via the first check valve 12a or the second check valve 12b.

Also a crossover relief valve mechanism 13 is provided between the first port 7a and the second port 7b as shown in FIG. 1. This crossover relief valve mechanism 13 is composed of two crossover relief valves 13a and 13b, which are disposed in parallel to the check valves 12a and 12b.

Here, the crossover relief valve mechanism 13 is provided so as to absorb rotational energy generated by rotation of the revolving motor 7, and the first crossover relief valve 13a is formed as a valve which allows flow of working oil from the first port 7a to the second port 7b when a pressure higher than a predetermined pressure is applied while the second crossover relief valve 13b is formed as a valve which allows flow of working oil from the second port 7b to the first port 7a when a pressure higher than the predetermined pressure is applied.

Each of the crossover relief valves 13a and 13b functions as a resistor, and when working oil passes the crossover relief valve 13a or 13b, the pressure of the working oil drops and is emitted as thermal energy, and consequently, the kinetic energy of the working oil drops.

The crossover relief valve mechanism 13 having such a construction as described above is provided in order that, when an operator tries to stop revolution of an upper revolving unit (construction machine revolving unit) 14, the upper revolving unit 14 may be stopped rapidly.

In particular, when the upper revolving unit 14 is to be revolved, an operator will operate a revolving operation member such as the operation lever 16 and so on (refer to FIG. 2) to control opening/closing operation of the first control valve 8 to rotate the revolving motor 7, but when the upper revolving unit 14 is to be stopped, the operation lever 16 must be returned to its neutral position before the upper revolving unit 14 comes to an aimed stopping position.

This is because, since a counterweight (not shown) is placed on the upper revolving unit 14, the upper revolving unit 14 has a high inertial force by revolution. Further, since the counterweight is placed at a position spaced by a distance as large as possible from the center of revolution of the upper revolving unit 14, there is another reason that also the angular moment is high.

Therefore, in order to prevent revolution of the upper revolving unit 14 by more than a required amount caused by such an inertial force as described above, when the upper revolving unit 14 is being revolved by an inertial force, the solenoid valves 81 to 84 are controlled to an off-state by the controller 9 to circulate working oil discharged from the first or second port 7a or 7b via the crossover relief valve mechanism 13. Thus, as the crossover relief valve mechanism 13 functions as a resistor, flow path resistance is applied to the working oil, and the kinetic energy of the upper revolving unit 14 is absorbed by the flow path resistance.

By the way, when the upper revolving unit 14 is revolved by an inertial force as described above, the revolving motor 7 operates as a hydraulic pump. In particular, in an ordinary operation, when high pressure working oil is supplied to the revolving motor 7, the revolving motor 7 operates as a hydraulic motor by the pressure of the working oil, but on the contrary, if a turning force is inputted from the upper revolving unit 14 to the revolving motor 7, then working oil at one of the ports 7a and 7b of the revolving motor 7 is pressurized to a high pressure by the kinetic energy inputted from the upper revolving unit 14 and high pressure working oil is discharged from the other one of the ports 7b and 7a.

Accordingly, if energy generated thereupon can be converted into thermal energy or the like and recovered efficiently by the crossover relief valve mechanism 13 instead of merely discharging the energy into the atmospheric air, then effective utilization of energy can be attained, and also the amount of fuel consumption of the engine 1 can be reduced.

The accumulator 5, bypass path 10k and solenoid valve 11 described above are provided in order to meet such a demand as just described, and is provided to regenerate energy generated by the revolving motor 7 when the upper revolving unit 14 is revolved by an inertial force. Working oil pressurized by the revolving motor 7 in this instance is temporarily accumulated into the accumulator 5 so that regeneration of energy may be performed.

It is to be noted that a sequence valve 15 is interposed at a portion in the bypass path 10k on the downstream side (accumulator 5 side) of the location of the solenoid valve 11. This sequence valve 15 functions as a relief valve, and the relief pressure of the sequence valve 15 is set lower than the relief pressure of the crossover relief valve mechanism 13.

Also for the bucket cylinder 30, the first control valve 8 for changing over the working oil supply state to the cylinder 30 is provided. However, since this first control valve 8 is similar to that provided for the revolving motor 7 described above, description thereof is omitted here.

Reference numeral 21 denotes a check valve provided on the upstream side of the first control valve 8.

In the following, a construction of the control system of the present apparatus is described with reference to FIG. 2. Sensors 16a and 18a for detecting operation conditions of the operation members (operation levers and pedals or the like) 16 and 18 for operating fluid actuators such as the revolving motor 7 and the bucket cylinder 30 and sensors 17 for detecting hydraulic pressures in the fluid paths, the accumulator 5 and so forth are connected to the controller 9 described above, and the controller 9 controls operations of the solenoid valves 4, 11 and 81 to 84 based on detection information from the sensors 16a, 17 and 18a.

Further, as shown in FIG. 2, first valve control means 9a and second valve control means 9b are provided in the controller 9. Of the first and second valve control means 9a and 9b, the first valve control means 9a is means for receiving an operation instruction from the operation lever 16 and setting and outputting a control signal to the first control valve 8, and the second valve control means 9b is means for controlling the solenoid valve (second control valve) 11 when it is discriminated based on detection information from the sensors 17 that the revolving motor 7 is being driven by the upper revolving unit 14.

The first valve control means 9a and the second valve control means 9b having such constructions as just described set control signals based on operation conditions of the operation levers 16 and 18 and so forth and an operation condition of the revolving motor 7 to control operations of the solenoid valves 4, 11 and 81 to 84.

Since the control apparatus for a construction machine as the embodiment of the present invention is constructed in such a manner as described above, operation control of the solenoid valves 4, 11 and 81 to 84 is performed in the following manner.

First, if the operation lever 16 is operated by an operator in order to rotate the revolving motor 7, then the controller 9 changes over the solenoid valves 81 and 84 or the solenoid valves 82 and 83 to an on-state and changes over the solenoid valve 4 of the accumulator 5 to an on-state in response to the operation condition of the operation lever 16. It is to be noted that such control of the solenoid valves 81 to 84 and 4 is principally executed by the first valve control means 9a in the controller 9.

Consequently, working oil in the hydraulic pump 2 and the accumulator 5 is fed to the first port 7a or the second port 7b of the revolving motor 7 so that the revolving motor 7 is rotated forwardly or reversely. Meanwhile, working oil discharged from the second port 7b or the first port 7a is drained from the fluid path 10i or the fluid path 10h to the working oil tank 3 via the solenoid valve 84 or the solenoid valve 82.

Further, if the operator returns the lever position to the neutral position trying to stop the revolving motor 7, then the solenoid valves 81 and 84 or the solenoid valves 82 and 83 are changed over to an off-state by the first valve control means 9a and the solenoid valve 11 is changed over to an on-state by the second valve control means 9b.

In this instance, since the revolving motor 7 is driven by an inertial force of the upper revolving unit 14 and operates as a hydraulic pump, working oil pressurized to a high pressure is delivered from the first port 7a or the second port 7b. This working oil is accumulated, since all of the solenoid valves 81 to 84 are in an off-state, into the accumulator 5 via the check valve 12a or 12b, solenoid valve 11 and sequence valve 15, thereby effecting regeneration of energy.

Thereupon, since the relief pressure of the sequence valve 15 is set lower than the relief pressures of the crossover relief valves 13a and 13b, working oil is accumulated into the accumulator 5 unless the solenoid valve 4 is changed over to an off-state.

Then, when it is detected that the pressure in the accumulator 5 becomes a high pressure higher than a predetermined value, the controller 9 changes over the solenoid valve 11 and the solenoid valve 4 to an off-state thereby to protect the accumulator 5.

It is to be noted that, even if the pressure in the accumulator 5 reaches the predetermined value and the solenoid valve 11 and the solenoid valve 4 are changed over to an off-state in this manner, if the revolving motor 7 still continues to be driven by the upper revolving unit 14, then a force to stop the revolving motor 7 acts as a result of an action of the crossover relief valve 13a or 13b so that the kinetic energy is absorbed.

In this manner, the control apparatus for a construction machine of the present invention is advantageous in that, when the revolving motor 7 is to be stopped, effective utilization of energy can be achieved by regenerating kinetic energy regenerated making use of an inertial force of the upper revolving unit 14.

In particular, when the revolving motor 7 is driven by the inertia of the upper revolving unit 14, working oil pressurized by the revolving motor 7 is accumulated into the accumulator 5 so that, when a next operation of the revolving motor 7 is to be started, the revolving motor 7 can be operated making use of the high pressure working oil in the accumulator 5, and the load to the engine 1 and the hydraulic pump 2 can be reduced. Further, by such energy regeneration, the amount of fuel consumption can be reduced.

Further, since the bypass path 10k for bypassing the first control valve 8 is provided between the revolving motor 7 and the accumulator 5 and the second control valve 11 is provided for the bypass path 10k, there is an advantage that, upon energy regeneration, working oil does not pass the first control valve 8 (solenoid valves 81 to 84) and has no influence upon the first control valve 8 for which a high degree of accuracy is required.

Further, since the check valve mechanism 12 for introducing working oil from the port 7a and the port 7b of the revolving motor 7 to the bypass path 11k is provided between the two ports 7a and 7b, counter-flow of working oil from the accumulator 5 can be prevented simply and with certainty.

Further, since the crossover relief valve mechanism 13 for absorbing rotational energy generated by revolution of the upper revolving unit 14 is provided in parallel to the check valve mechanism 12, if the pressure in the accumulator 5 rises higher than a necessary level, the rotational energy is absorbed by the crossover relief valve mechanism 13, and the upper revolving unit 14 can be stopped with certainty.

Furthermore, since the sequence valve 15 is provided at a portion adjacent the accumulator with respect to the location of the solenoid valve (second control valve) 11 described above and the relief pressure of the sequence valve 15 is set lower than the relief pressure of the crossover relief valve mechanism 13, upon regeneration of energy, high pressure working oil produced by the revolving motor 7 can be introduced preferentially into the accumulator 5, and consequently, there is an advantage that energy regeneration can still be performed efficiently.

Further, since the solenoid valve (opening and closing valve) 4 is provided at the fluid inflow/outflow port of the accumulator 5, when the pressure in the accumulator 5 excessively rises, the accumulator 5 can be protected with certainty by closing this solenoid valve 4. Further, by controlling this solenoid valve 4, only when required, the high pressure working oil accumulated in the accumulator 5 can be supplied by a required amount to the fluid pressure actuator.

It is to be noted that, while it is described above that the first control valve 8 is constructed using a solenoid valve of the spool valve type, the first control valve 8 may be constructed using any other solenoid valve than such a solenoid valve of the spool valve type such as, for example, a solenoid valve of the poppet valve type.

Further, while it is described in the foregoing description of the embodiment that the first control valve 8 is constructed as a separate control type valve mechanism wherein working oil supply and working oil discharge are controlled independently of each other, in the present invention, the application of the apparatus of the present invention is not limited to a hydraulic circuit which uses such a separate control type valve mechanism as described above, but the present apparatus may be applied to a hydraulic circuit which employs, for example, an ordinary 3-position changeover valve.

Further, while only the construction wherein working oil delivered from the revolving motor 7 is regenerated is described in the foregoing description, the present invention is not limited to such a construction as just described, but, for example, the construction between the traveling motor not shown and the accumulator 5 may be constructed in a similar manner as described above such that energy can be regenerated also when the traveling motor is driven by a force applied from the outside.

INDUSTRIAL APPLICABILITY OF THE INVENTION

Where the present invention is applied to a construction machine such as a hydraulic excavator or a hydraulic shovel, when revolution motion of a revolving unit of the construction machine is started, a fluid pressure actuator can be operated making use of high pressure working oil accumulated in an accumulator, and the amount of fuel consumption for operating a fluid pressure pump can be reduced. Accordingly, excess energy of a construction machine of the type mentioned can be utilized effectively, and it is considered that the availability of the present invention is very high.

We claim:

1. A control apparatus for a construction machine, characterized in that it comprises:

operation means (24) at least having a revolving operation member (16, 18) for operating a construction machine revolving unit (14) of said construction machine:

working fluid supply means (22) at least including a fluid pressure pump (2) driven by a prime mover (1) and an accumulator (5) for accumulating working fluid on the discharge side of said fluid pressure pump (2);

driving means (23) including a fluid pressure actuator (7) for driving said construction machine revolving unit (14) to revolve with the working fluid from said working fluid supply means (22);

valve means (19) including a first control valve (8) interposed between said driving means (23) and said working fluid supply means (22) for controlling a revolution condition of said construction machine revolving unit (14) by said fluid pressure actuator (7), and a second control valve (11) interposed between said fluid pressure actuator (7) and said accumulator (5) for controlling an inflow condition of the fluid from said fluid pressure actuator (7) into said accumulator (5) when said fluid pressure actuator (7) is driven by said construction machine revolving unit (14); and control means (9) including first valve control means (9a) for controlling said first control valve (8) in response to an operation instruction received from said revolving operation member (16, 18) and second valve control means (9b) for controlling said second control valve (11) when said fluid pressure actuator (7) is driven by said construction machine revolving unit (14).

2. A control apparatus for a construction machine as set forth in claim 1, characterized in that a bypass path (10k) for bypassing said first control valve (8) is interposed between said fluid pressure actuator (7) and said accumulator (5), and said second control valve (11) is interposed in said bypass path (10k).

3. A control apparatus for a construction machine as set forth in claim 2, characterized in that a check valve mechanism (12) for introducing the fluid from any of a pair of inflow/outflow ports (7a, 7b) of said fluid pressure actuator (7) to said bypass path (10k) is provided between said inflow/outflow ports (7a, 7b).

4. A control apparatus for a construction machine as set forth in claim 3, characterized in that a crossover relief valve mechanism (13) for absorbing rotational energy generated by revolution of said construction machine revolving unit (14) is provided in parallel to said check valve mechanism (12).

5. A control apparatus for a construction machine as set forth in claim 4, characterized in that a sequence valve (15) having a relief pressure set lower than a relief pressure set for said crossover relief valve mechanism (13) is interposed at a portion of said bypass path (10k) adjacent said accumulator (5) side with respect to a location of said second control valve (11).

6. A control apparatus for a construction machine as set forth in claim 1, characterized in that an opening and closing valve (4) is provided at a fluid inflow/outflow port of said accumulator (5).

* * * * *